United States Patent
Alsmadi

(10) Patent No.: US 10,417,483 B2
(45) Date of Patent: Sep. 17, 2019

(54) FACIAL EXPRESSION RECOGNITION

(71) Applicant: Imam Abdulrahman Bin Faisal University, Dammam (SA)

(72) Inventor: Mutasem K. Alsmadi, Dammam (SA)

(73) Assignee: Imam Abdulrahman Bin Faisal University, Dammam (SA)

( * ) Notice: Subject to any disclaimer, the term of this patent is extended or adjusted under 35 U.S.C. 154(b) by 69 days.

(21) Appl. No.: 15/877,900

(22) Filed: Jan. 23, 2018

(65) Prior Publication Data
US 2018/0211102 A1    Jul. 26, 2018

Related U.S. Application Data

(60) Provisional application No. 62/450,227, filed on Jan. 25, 2017.

(51) Int. Cl.
| | | |
|---|---|---|
| *G06K 9/00* | (2006.01) | |
| *G06K 9/66* | (2006.01) | |
| *G06K 9/62* | (2006.01) | |
| *G06N 3/12* | (2006.01) | |
| *G06N 3/08* | (2006.01) | |

(52) U.S. Cl.
CPC ..... *G06K 9/00315* (2013.01); *G06K 9/00228* (2013.01); *G06K 9/00281* (2013.01); *G06K 9/00308* (2013.01); *G06K 9/6267* (2013.01); *G06K 9/6273* (2013.01); *G06K 9/66* (2013.01); *G06N 3/084* (2013.01); *G06N 3/126* (2013.01)

(58) Field of Classification Search
CPC ............. G06K 9/00315; G06K 9/6273; G06K 9/00308; G06K 9/00281; G06K 9/00228; G06K 9/6267; G06K 9/66; G06N 3/084; G06N 3/126
USPC ........................................................ 382/118
See application file for complete search history.

(56) References Cited

U.S. PATENT DOCUMENTS 6,600,830 B1    7/2003   Lin et al.

FOREIGN PATENT DOCUMENTS

CN              105469080 A    4/2016

OTHER PUBLICATIONS

Montana, David J., and Lawrence Davis. "Training Feedforward Neural Networks Using Genetic Algorithms." IJCAI. vol. 89. 1989. (Year: 1989).*

(Continued)

*Primary Examiner* — Andrew M Moyer
(74) *Attorney, Agent, or Firm* — Oblon, McClelland, Maier & Neustadt, L.L.P.

(57) ABSTRACT

The disclosure provides an automatic geometric method for analyzing and recognizing human facial expressions based on extracted features using a neural network. The extracted features are obtained from extracted right eye, left eye and mouth using radial curves and Cubic Bezier curves. Facial expressions are classified into seven different emotion categories, namely surprise, happiness, disgust, neutral, fear, sadness and anger. The method employs an algorithm which hybridizes genetic algorithms (GA) and iterated local search (ILS) with back-propagation algorithm (BP). The BP is used to train the neural network. The GA and ILS are used to enhance and optimize initial weights of the BP.

20 Claims, 12 Drawing Sheets

(56) References Cited

OTHER PUBLICATIONS

Rohini Patil, et al., "Automatic face emotion recognition and classification using Genetic Algorithm", IOSR Journal of Electrical and Electronics Engineering, vol. 9, Issue 5 Version II, Sep.-Oct. 2014, pp. 63-68.
Manish Dixit, et al., "Face Recognition Using Approximated Bezier Curve and Supervised Learning Approach", International Journal of Multimedia and Ubiquitous Engineering, vol. 10, No. 4, 2015, pp. 311-324.
Shrutika C. Dhargave, et al., "Survey Paper on Methods of Emotion Detection From Still Images", International Journal of Current Engineering and Scientific Research, vol. 2, Issue 2, 2015, pp. 69-77.
Anchal Garg, et al., "Facial expression recognition & classification using hybridization of ICA, GA, and Neural Network for Human-Computer Interaction", Journal of Network Communication and Emerging Technologies, vol. 2, Issue 1, May 2015, pp. 49-57.

\* cited by examiner

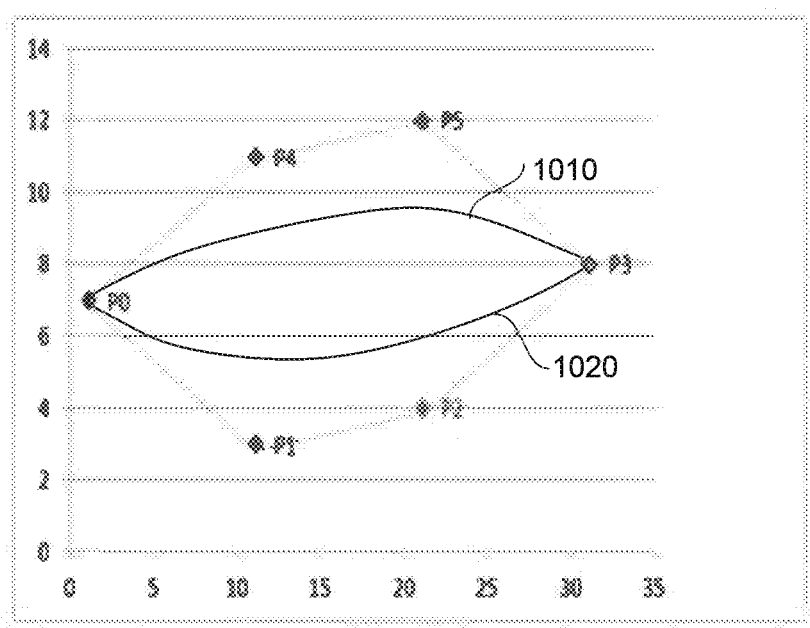
FIG. 10
      
FIG. 11A     FIG. 11B     FIG. 11C

FIG. 15

| Methods | Number of extracted features |
|---|---|
| Extracted features using radial curves | 23 |
| Extracted features using Cubic Bézier curves | 23 |
| Extracted features using radial curves and Cubic Bézier curves | 46 |

FIG. 16

| Classifiers | Neurons number | |
|---|---|---|
| | Hidden layer | Output layer |
| BP Algorithm | 45 | 7 |
| ILSGA-BP algorithm | 45 | 7 |

FIG. 17

| Parameter | Value |
|---|---|
| Population size | 100 |
| Crossover | 08 |
| Crossover type | Single point |
| Mutation rate | 0.02 |
| Fitness value threshold | 0.8 |

| Facial Expressions | Disgust | Neutral | Anger | Sadness | Happiness | Fear | Surprise | Accuracy% |
|---|---|---|---|---|---|---|---|---|
| Disgust | 24 | 3 | 2 | | | 3 | | 80 |
| Neutral | | 25 | 1 | | 2 | 1 | 1 | 83 |
| Anger | 1 | | 25 | 2 | 2 | 1 | | 83 |
| Sadness | | | 2 | 27 | | | | 90 |
| Happiness | | | | | 29 | | 1 | 97 |
| Fear | 1 | | 1 | | 1 | 26 | 1 | 87 |
| Surprise | | | | | | 1 | 29 | 97 |
| Overall accuracy | | | | | | | | 88 |

FIG. 18

| Facial Expressions | Disgust | Neutral | Anger | Sadness | Happiness | Fear | Surprise | Accuracy% |
|---|---|---|---|---|---|---|---|---|
| Disgust | 25 | 2 | 3 | | | 2 | | 83 |
| Neutral | | 25 | 2 | | 1 | 1 | 1 | 83 |
| Anger | 1 | | 26 | 2 | 1 | 1 | | 87 |
| Sadness | | | 1 | 27 | 1 | 1 | | 90 |
| Happiness | | | | | 28 | | 1 | 93 |
| Fear | | | | | 1 | 27 | 1 | 90 |
| Surprise | | | | | | 1 | 29 | 97 |
| Overall accuracy | | | | | | | | 89 |

| Facial Expressions | Disgust | Neutral | Anger | Sadness | Happiness | Fear | Surprise | Accuracy% |
|---|---|---|---|---|---|---|---|---|
| Disgust | 28 | | | | | 1 | 1 | 93 |
| Neutral | | 26 | 1 | | 1 | 1 | 1 | 87 |
| Anger | 1 | | 27 | 1 | | | | 90 |
| Sadness | | | 1 | 28 | 1 | | | 93 |
| Happiness | | | | | 29 | | 1 | 97 |
| Fear | | | | | 1 | 29 | | 97 |
| Surprise | | | | | 1 | | 29 | 97 |
| Overall accuracy | | | | | | | | 93.4 |

FIG. 21

| Algorithms | Overall accuracy | | |
|---|---|---|---|
| | Radial curves | Cubic Bezier curves | Radial curves and Cubic Bezier curves |
| Traditional BP algorithm | 83% | 82% | 85% |
| The proposed HLSGA-BP algorithm | 88% | 89% | 93.4% |

FACIAL EXPRESSION RECOGNITION

INCORPORATION BY REFERENCE

This present disclosure claims the benefit of U.S. Provisional Application No. 62/450,227, "Facial Recognition under Expression Variations" filed on Jan. 25, 2017, which is incorporated herein by reference in its entirety.

BACKGROUND

The background description provided herein is for the purpose of generally presenting the context of the disclosure. Work of the presently named inventors, to the extent the work is described in this background section, as well as aspects of the description that may not otherwise qualify as prior art at the time of filing, are neither expressly nor impliedly admitted as prior art against the present disclosure.

The following references [1]-[31] provide background information related to the disclosure, and are incorporated herein by reference in their entirety:

[1] Cranach K F., Lepenies W., and Ploog D., "About brows: Emotional and conversational signals," Cambridge, London, 1979;

[2] Kandemir R., and Ozmen G., "Facial Expression Classification with Haar Features, Geometric Features And Cubic Bezier Curves." IU-Journal of Electrical & Electronics Engineering, vol. 13, no. 2, pp. 1667-1673, 2013;

[3] Fasel B., and Luettin J., "Automatic facial expression analysis: a survey,". Pattern Recognition, vol. 36, no. 1, pp. 259-275, 2003;

[4] Khalid F., and Lili N., "3D Face Recognition Using Multiple Features for Local Depth Information," IJCSNS, vol. 9, no. 1, pp. 27-32, 2009;

[5] Boughrara H., Chen L., Ben Amar C., and Chtourou M., "Face recognition under varying facial expression based on Perceived Facial Images and local feature matching," In Information Technology and e-Services (ICITeS), 2012 International Conference on, Sousse, pp. 1-6, 2012;

[6] Das D., "Human's Facial Parts Extraction to Recognize Facial Expression," International journal on information theory, vol. 3, no. 3, pp. 65-72, 2014;

[7] Chen Y., Zhang S., and Zhao X., "Facial Expression Recognition via Non-Negative Least-Squares Sparse Coding," Information, vol. 5, no. 2, pp. 305-318, 2014;

[8] Drira H., Ben Amor B., Srivastava A., Daoudi M., and Slama R., "3D face recognition under expressions, occlusions, and pose variations," Pattern Analysis and Machine Intelligence, IEEE Transactions on, vol. 35, no. 9, pp. 2270-2283, 2013;

[9] Lei Y., Bennamoun M., and El-Sallam A., "An efficient 3D face recognition approach based on the fusion of novel local low-level features," Pattern Recognition, vol. 46, no. 1, pp. 24-37, 2013;

[10] Filko D., and Martinovic G., "Emotion recognition system by a neural network based facial expression analysis," Automatika—Journal for Control, Measurement, Electronics, Computing and Communications, vol. 54, no. 2, pp. 263-272, 2013;

[11] Michalewicz Z., Genetic algorithms+data structures=evolution programs, Springer-Verlag, Berlin Heidelberg, 2013;

[12] Alsmadi M., Omar K., Noah S., and Almarashdeh I., "A hybrid memetic algorithm with back-propagation classifier for fish classification based on robust features extraction from PLGF and shape measurements," Information Technology Journal, vol. 10, no. 5, pp. 944-954, 2011;

[13] Derbel H., Jarboui B., Hanafi S., and Chabchoub H., "Genetic algorithm with iterated local search for solving a location-routing problem," Expert Systems with Applications, vol. 39, no. 3, pp. 2865-2871, 2012;

[14] Dixit M., and Silakari S., "A Hybrid Approach of Face Recognition Using Bezier Curve," International Journal of Advanced Science and Technology, vol.71, pp. 41-48, 2014;

[15] Nowosielski A., "Mechanisms for increasing the efficiency of holistic face recognition systems," methods, vol. 1, no. 5, pp. 7-9, 2015;

[16] Berbar M A., "Novel colors correction approaches for natural scenes and skin detection techniques," International Journal of Video & Image Processing and Network Security IJVIPNS-IJENS, vol. 11, no. 2, pp. 1-10, 2011;

[17] Yogarajah P., Condell J., Curran K., McKevitt P., and Cheddad A., "A dynamic threshold approach for skin tone detection in colour images," International Journal of Biometrics, vol. 4, no. 1, pp. 38-55, 2011;

[18] Berbar M A., "Skin colour correction and faces detection techniques based on HSL and R colour components," International Journal of Signal and Imaging Systems Engineering, vol. 7, no. 2, pp. 104-115, 2014;

[19] Chai D., and Ngan K N., "Face segmentation using skin-color map in videophone applications. Circuits and Systems for Video Technology," IEEE Transactions on, vol. 9, no. 4, pp. 551-564, 1999;

[20] Burange M S., and Dhopte S V., "Neuro Fuzzy Model for Human Face Expression Recognition," IOSR Journal of Computer Engineering, vol. 1, no. 2, pp. 1-6, 2012;

[21] Vijayarani S., and Priyatharsini S., "Comparative Analysis of Facial Image Feature Extraction Algorithms," Journal of Multidisciplinary Engineering Science and Technology, vol. 2, no. 2, pp. 107-112, 2015;

[22] Radial Curve, MathWorld—A Wolfram Web Resource, http://mathworld.wolfram.com/RadialCurve.html;

[23] Catenary Radial Curve, MathWorld—A Wolfram Web Resource.[Online]. [Accessed 21/5/2015], http://mathworld.wolfram.com/CatenaryRadialCurve.html;

[24] Pal A., "Bezier curves and representation of reservoir extent maps," In 10th Biennial International Conference & Exposition, pp. 1-5;

[25] Wallhoff, F. (2013). Facial Expressions and. Emotion Database.[Online] [Accessed 21/7/2015], http://cotesys.mmk.e-technik.tu-muenchen.de/isg/content/feed-database;

[26] Badawi. U A., and Alsmadi M., "A Hybrid. Memetic Algorithm (Genetic Algorithm and Great Deluge Local Search) With Back-Propagation Classifier for Fish Recognition," IJCSI, vol. 10, no. 2, pp. 1694-0784, 2014;

[27] Alsmadi M., Omar K B., Noah S A., and Almarashdeh I., "Fish Recognition Based on Robust Features Extraction from Size and Shape Measurements Using Neural Network," Journal of Computer Science, vol. 6, no. 10, pp. 1088-1094, 2010;

[28] Wallhoff F., Schuller B., Hawellek M., and Rigoll G., "Efficient recognition of authentic dynamic facial expressions on the feedtum database," In Multimedia and Expo, 2006 IEEE International Conference on, Toronto, Ont, pp. 493-496, 2006;

[29] Tan K C., Lee T H., Khoo D., and Khor E F., "A multiobjective evolutionary algorithm toolbox for computer-aided multiobjective optimization," Systems, Man, and Cybernetics, Part B: Cybernetics, IEEE Transactions on, vol. 31, no. 4, pp. 537-556, 2001;

[30] Baker J E., "Reducing bias and inefficiency in the selection algorithm," In Proceedings of the second international conference on genetic algorithms, Lawrence Erlbaum Associates, Inc Hillsdale, New Jersey, pp. 14-21, 1987; and

[31] Sheta A F., "Estimation of the COCOMO model parameters using genetic algorithms for NASA software projects," Journal of Computer Science, vol. 2, no. 2, pp. 118-123, 2006.

Facial expression is an important mean for human beings to interact with the environment and other persons in the vicinity. Facial expression is related to many sources as seen in FIG. 1. Automatic machine recognition of human facial expression enables a computing system to perceive and understand intentions and emotions as communicated by a human being. Various approaches have been studied in the field of automatic facial expression.

A two dimensional (2D) facial expression recognition approach is described in the reference [5]. The approach is based on local feature matching and perceived facial images, and employs a new biological vision-based facial description which is called Perceived Facial Images (PFIs). The approach is originally used for three dimensional (3D) face recognition, and aims to give a graphical representation simulating human visual perception. The approach is robust in affining the facial expressions and lighting transformations.

An individual independent real-time facial expression recognition method is described in the reference [6]. Geometry of a face is extracted by an adapted active shape model (ASM). Every face geometry part is efficiently represented using Census Transformation histogram of features. The face expressions are classified using support vector machine classifier and exponential chi-square weighted merging kernel. The method is tested on JAFFE database, and the testing results show that this method can be applied on real-time facial expression experiments and produces good accuracy results.

An approach for facial expression recognition using non-negative least squares sparse coding is described by the reference [7]. This proposed approach is utilized to build a classifier for facial expressions. In order to test the performance of the proposed approach, the raw pixels and the local binary patterns are extracted to represent the facial features. They also used the JAFFE database for testing the proposed approach and the results show that the approach obtains better accuracy rates compared with other facial expression recognition methods.

A new geometric framework is described in the reference [8]. The framework can be used to analyze 3D faces, and is based on specific aims of matching, comparing and averaging of faces shapes. The radial curves arising from the nose tip are employed. The obtained curves are used to develop a Riemannian framework using elastic shape analysis for exploring full shapes of facial surfaces. An elastic Riemannian metric is used for measuring facial distortions. The framework is robust to many challenges such as large pose variations, hair, different and large facial expressions and missing parts. The framework shows promising results for both theoretical and empirical perspectives. The proposed framework enables the formal statistical inferences. Test results are obtained based on three noticeable databases: Bosphorus, FRGCv2 and GavabDB, and exceeds or matches other similar methodologies.

A novel approach for 3D face recognition is described in the reference [9]. The approach is based on some low-level geometric features that are collected and extracted from nose and eyes-forehead areas. These areas are less subjective to distortions that may be produced due to the facial expressions. The extracted features are used to compute a region-based histogram descriptor. The Support Vector Machine (SVM) is used as a classifier. The experimental results show the success of the feature-level fusion scheme compared with score-level fusion in obtaining higher verification rates.

Two dimension facial images with different expressions are analyzed in the reference [2]. The expressions include anger, sadness, surprise, fear, smile, neutral and disgust. The Viola-Jones algorithm is used for face detector. The AdaBoost algorithm is used to locate and determine the face location. In order to find and extract mouth and eyes regions, Haar filters as well as the ratios of facial geometric are used to decrease the mouth and eyes detection error. Cubic Bezier curves are used in recognizing and determining the facial expressions. The FEEDTUM database is used in the training and testing processes to validate the proposed methods. The experimental results show that the success rates of the proposed methods ranged between 60% and 97% .

A 2D recognition system for human expressions is proposed by the reference [10]. The proposed system works based on studying the important keys in the facial regions using principal component analysis (PCA) and neural networks (NNs). PCA is used to decrease elements number in the features vectors. The NNs are used because they are adapted to specific classification problems, and pel mit higher flexibility in the training process. The FEEDTUM database is used to train and test the proposed methods. The obtained results show high recognition accuracy range (46%-80%).

Genetic algorithm (GA) is a heuristic algorithm, and is a population based approach. GA simulates the process of selection in the nature, and is utilized to find solutions to complicated problems from a population of solutions. Generally, GA can include three major steps: selection, crossover, and mutation. A selection mechanism is used to select solutions for producing a next generation of population. Selection mechanisms can include Roulette Wheel Selection, Truncation Selection, and Tournament Selection. Crossover is performed in a mating procedure. The mating procedure finds new solutions (higher fitness value) from the search space. Mutation is a local search process that finds neighborhood solutions then disturbs the population to improve the search space. GA is described in the reference [11].

Iterated local search (ILS) is a simple, effective, robust, and easy to implement algorithm. ILS performs a local search in a partial sub-space as an alternative to the search in a whole solution search space. ILS aims to find a local optimum solution, then performs a solution perturbation and restarts a local search in a sub-space including the modified solution. ILS avoids being trapped in local optima by disturbing the local optimum solutions, and using them to generate new solutions randomly. An example of ILS algorithm is described in the reference [13].

SUMMARY

The disclosure provides an automatic geometric method for analyzing and recognizing human facial expressions based on extracted features using a neural network. The extracted features are obtained from extracted right eye, left eye and mouth using radial curves and Cubic Bezier curves. Facial expressions are classified into seven different emotion categories, namely surprise, happiness, disgust, neutral, fear, sadness and anger. The method employs an algorithm which hybridizes genetic algorithms (GA) and iterated local search (ILS) with back-propagation algorithm (BP). The BP is used to train the neural network. The GA and ILS are used to enhance and optimize initial weights of the BP.

An embodiment of the method can include creating a feedforward neural network (FNN) for facial expression recognition, performing a genetic algorithm (GA) process for optimizing network parameters of the FNN to obtain a first set of network parameters of the FNN, performing a backpropagation (BP) training process with the first set of network parameters of the FNN as initial network parameters to obtain a second set of network parameters of the FNN, and performing facial expression recognition using the trained FNN configured with the second set of network parameters.

In one example, performing the GA process includes generating an initial generation of chromosome each representing a set of network parameters of the FNN, each chromosome including a sequence of binary strings, each binary string corresponding to a value of a network weight or bias of the FNN, evaluating fitness of chromosomes in a current generation, wherein a fitness value of a chromosome is calculated based on a variance-accounted-for (VAF) function, selecting parent chromosomes from the current generation for reproducing child chromosomes, performing genetic operations to reproduce child chromosomes, performing an iterated local search (ILS) based on the reproduced child chromosomes to obtain optimized child chromosomes, and repeating selecting parent chromosomes, performing genetic operations, performing the ILS, and evaluating fitness of chromosomes until a stopping condition is satisfied.

In one example, the stopping condition includes whether a chromosome having a fitness value above a fitness value threshold is found. In one example, the FNN includes an input layer including input nodes, a hidden layer including hidden nodes, and an output layer including output layer. Extracted features of a facial expression forms an input vector that is applied to the input layer, and an output vector corresponding to the facial expression is generated at the output layer indicating an emotion category the facial expression is classified into.

In one example, each chromosome is formed by concatenating a first network weight vector, a third network weight vector, a first bias vector, and a second bias vector. The first network weight vector includes connection weights of network connections between the input layer and the hidden layer of the FNN. The second network weight vector includes connection weights of network connections between the hidden layer and the output layer of the FNN. The first bias vector includes biases of the hidden nodes, and the second bias vector includes biases of the output nodes. In one example, the extracted features are extracted using radial curves, or cubic Bezier curves, or includes a combination of extracted features extracted using radial curves and cubic Bezier curves, respectively.

In one example, performing facial expression recognition using the trained FNN includes receiving an input image of a facial expression corresponding to an emotion category, determining a skin area by classifying pixels in the input image into skin pixels and non-skin pixels based on values of color components of the respective pixels in the input image, extracting a face area from the input image based on the skin area, extracting images of facial parts from the extracted face area, the facial parts including a left eye, a right eye, and a mouth included in the input image, extracting facial expression features from the facial part images using radial curves, or/and cubic Bezier curves, and applying the extracted features to the trained FNN to determine an emotion category of the input facial expression.

Aspects of the disclosure further provide an apparatus implementing the method, and a non-transitory computer-readable medium having instructions causing a computer to perform the method.

BRIEF DESCRIPTION OF THE DRAWINGS

Various embodiments of this disclosure that are proposed as examples will be described in detail with reference to the following figures, wherein like numerals reference like elements, and wherein:

FIG. 10 shows an example of two cubic Bezier curves;

FIGS. 11A-11C show three cubic Bezier curves corresponding to a set of extracted right eye, left eye and mouth according to an embodiment of the disclosure;

FIG. 15 show numbers of extracted features used in different experiments;

FIG. 16 shows numbers of hidden nodes or output nodes in feedforward neural networks for experiments based on the traditional BP algorithm or the ILSGA-BP algorithm;

FIG. 17 shows a set of parameters used by a neural network training process during the experiments;

FIGS. 18-21 show tables of experiment results; and

DETAILED DESCRIPTION OF EMBODIMENTS

I. Process of Facial Expression Recognition

Figure 1:
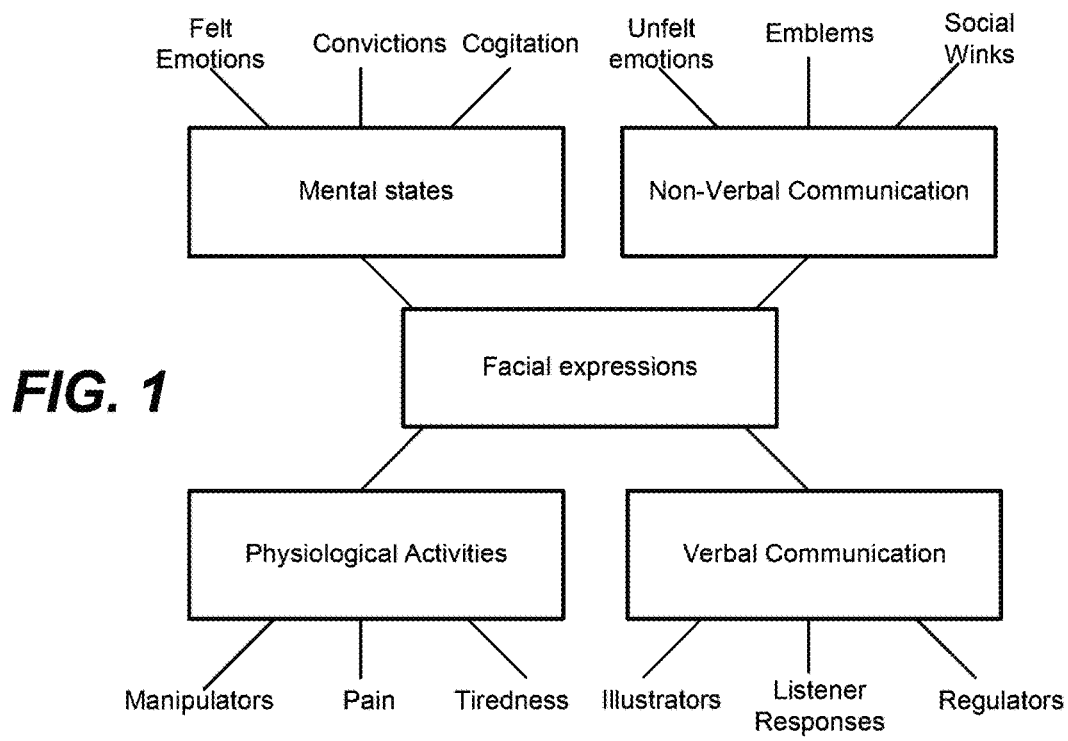
FIG. 1 shows sources related with human facial expressions.
Figure 2:
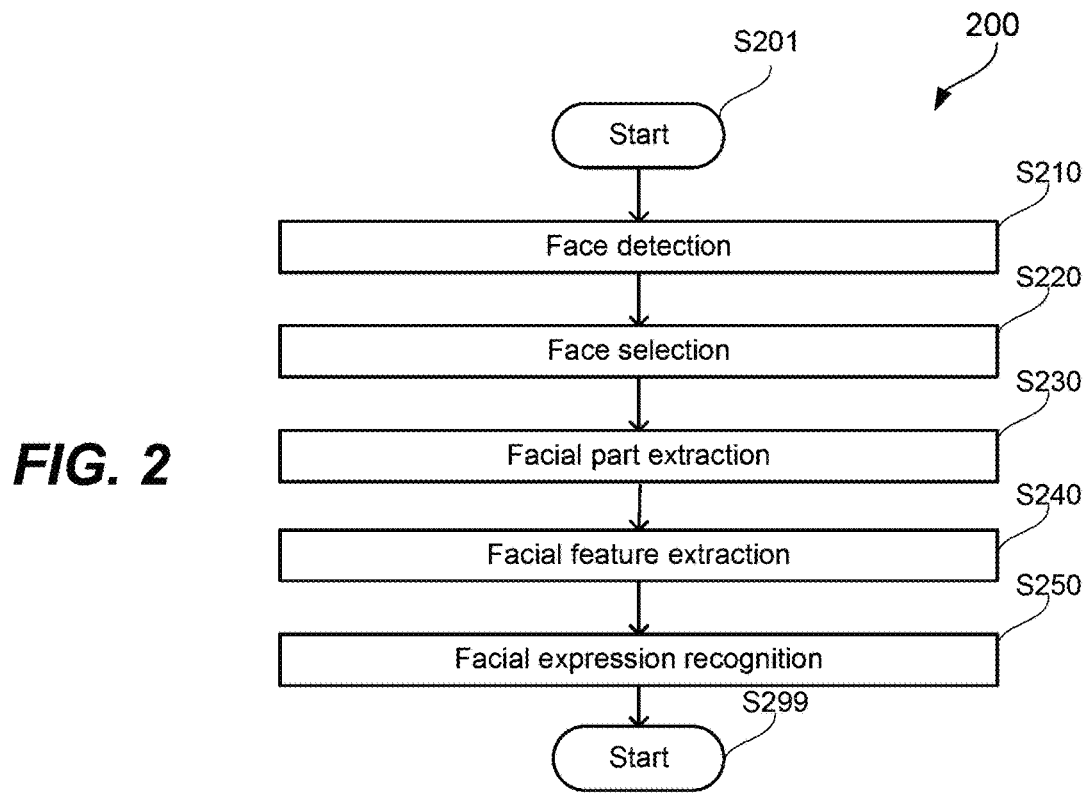
FIG. 2 shows a flowchart of an example facial expression recognition process according to an embodiment of the disclosure.

FIG. 2 shows a flowchart of an example facial expression recognition process 200 according to an embodiment of the disclosure. The process 200 starts at S201 and proceeds to S210.

At S210, face detection is performed to determine a skin area containing a human face. In one example, an input image containing a human face can be received at a facial expression recognition system. The human face in the input image may exhibit different facial expressions. The facial expressions can be categorized into seven emotion categories, namely surprise, happiness, disgust, neutral, fear, sadness and anger. A region including the human face in the scene of the image can be subsequently identified. For example, pixels of the input image can be identified as skin pixels or non-skin pixels and a region (skin area) corresponding to the skin pixels can be detertnined to be the region containing the human face.

At S220, face selection is peach led to obtain an extracted face area. In one example, a square image containing the human face is determined based on the skin area in the input image, and is extracted from the input image. The extracted image is referred to as an extracted face area.

At S230, facial part extraction is performed. In one example, based on the extracted face area obtained at S220, images of three facial parts including right eye, left eye, and mouth are located and extracted from the extracted face area.

At S240, facial feature extraction is performed. In one example, radial curves are used to represent features of respective facial parts. In another example, cubic Bezier curves are used to represent features of respective facial parts.

At S250, facial expression recognition is performed. In one example, the extracted facial features are fed to a neural network. As a result, facial expressions corresponding to respective input facial features are classified into different motion categories. In addition, in one example, the neural network is trained by a backpropagation algorithm (BP), and initial weights used by the BP are optimized by a combination of a genetic algorithm (GA) and an iterated local search algorithm (ILS).

II. Face Detection

In an example face detection process, skin area and non-skin area are detected and segmented based on color of the respective areas. To do that, pixels in an input image are classified into skin pixels and non-skin pixels based on values of color components of the respective pixels in the input image. In one example, input images are represented with the YCrCb color space. For examples, pixels in the input image can correspond to three color components: Y represents a luma component, and Cb and Cr represent the blue-difference and red-difference chroma components. Based on Cb and Cr chroma component values corresponding to a pixel, the pixel can be determined to be a skin pixel or a non-skin pixel.

Specifically, a first skin color range of Cr component, represented as R(Cr), and a second skin color range of Cb component, represented as R(cb), can be determined based on experiments. Accordingly, when values of the Cr and Cb components of a pixel are within the skin color ranges R(Cr) and R(Cb), respectively, the pixel can be determined to be a skin pixel. Otherwise, when the value of the Cr components of the pixel is not within the skin color ranges R(Cr), or when the value of the Cb components of the pixel is not within the skin color ranges R(Cb), the pixel can be determined to be a non-skin pixel. In one example, the Cr skin color range is between 133 and 137, while the Cb skin color range is between 77 and 127.

In one example, an input image has a size of M×N pixels and is represented with a format of 420. Chroma components Cr and Cb are subsampled with a subsampling rate of 50%. Accordingly, an output bitmap image of the face detection operation can be represented as follows, $$O(x, y) = \begin{cases} 0, & \text{if } [Cr(x, y) \in R(Cr) \cap [Cb(x, y) \in R(Cb)] \\ 1, & \text{otherwise} \end{cases} \quad (1)$$

where x and y are coordinates of each chroma component pixel, $x=1, \ldots, M/2$, $y=1, \ldots, N/2$, and $O(x,y)$ represents an output pixel value of the output bit map image. As indicated by the expression (1), an output pixel value $O(x,y)$ of a pixel $(x,y)$ is set to be 0 when a first chroma component $Cr(x, y)$ of the pixel is within the skin color range $R(Cr)$ and a second chroma component $Cb(x, y)$ of the pixel is within the skin color range $R(Cb)$. Otherwise, the output pixel value $O(x,y)$ is set to be 1. Accordingly, pixels in the input image corresponding to $O(x, y)=0$ can be determined to be skin color pixels, while pixels in the input image corresponding to $O(x, y)=1$ can be determined to be non-skin color pixels.

Figure 3:
FIG. 3 shows an input image to a facial expression recognition system.
Figure 4:
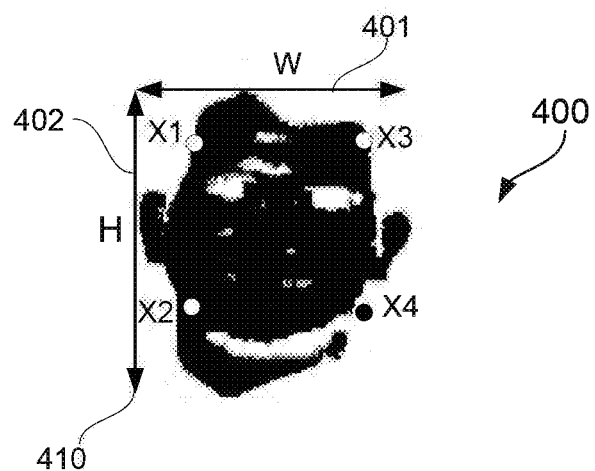
FIG. 4 shows an output bitmap image.

As an example, FIG. 3 shows an input image 300 to a facial expression recognition system, and FIG. 4 shows an output bitmap image 400 that is an output of the face detection operation performed on the input image 400. In the bitmap image 400, skin area containing skin pixels are illustrated with black color and correspond to a region containing a human face, while non-skin area containing non-skin pixels are illustrated with white color.

According to the disclosure, the method of using skin color ranges to classify pixels into skin or non-skin pixels is robust in recognizing skin regions having different kinds of skin colors. The justification for using similar Cb and Cr distributions for various skin colors of different races is that the skin color differences perceived by the viewer are generally due to the skin fairness or darkness, which are characterized by the color brightness variations caused by Y luma component not Cb or Cr chroma components. In contrast, characteristics of skin or non-skin areas can be indicated by pixel values of Cb or Cr chroma components.

III. Face Selection

In an example face selection process, a face area is extracted from a skin area in the output bitmap image obtained from the face detection operation. In one example, distance measurements are used to locate and extract the face area. Specifically, the face selection process can include the following steps as described with reference to FIG. 4.

At step 1, establish a coordinate system having a horizontal x-axis and a vertical y-axis. The height (H) 401 of the skin area along the y-axis and the width (W) 402 of the skin area along the x-axis can be determined based on the output image of the face detection operation. Set the bottom-left point of the square area with the height (H) 402 and the width (W) 401 as the origin 410 of the coordinate system. At step 2, move horizontally a distance D1=W/6 from the position (0, H/2) to obtain a left boundary of skin area. At step 3, move a distance D2=H/6 from the pixel position (W/6, H/2) in up direction to locate a point X1 and move a distance D2=H/6 from the pixel position (W/6, H/2) downward to locate a point X2.

Figure 5:
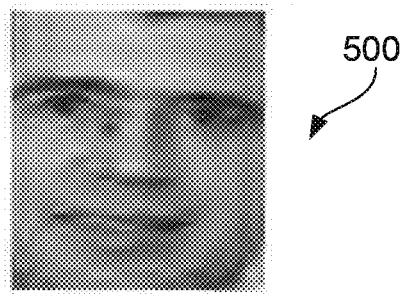
FIG. 5 shows an extracted face area with luma and chroma component pixels obtained from an original input image.

At step 4, move a distance D3=2W/3 from the point X1 to the right direction to localize a point X3 and move a distance D3=2W/3 from the point X2 to the right direction to localize a point X4. As a result, the square image is extracted to be the face area. In one example, luma and aroma component pixel values of pixels within the extracted face area in the input image are provided for a next facial part extraction operation. As an example, FIG. 5 shows an extracted face area 500 with luma and chroma component pixels obtained from the original input image 300 shown in FIG. 3.

IV. Facial Part Extraction

In an example facial part extraction process, bounded square image of right eye, left eye, and mouth are obtained. Generally, human face consists of different part such as chine, mouth, eyes and nose. Shape, structure and size of those face parts vary with different facial expressions. Particularly, shape of eyes and mouth can be employed to distinguish between different facial expressions. The example facial part extraction process can include the following steps.

Figure 6:
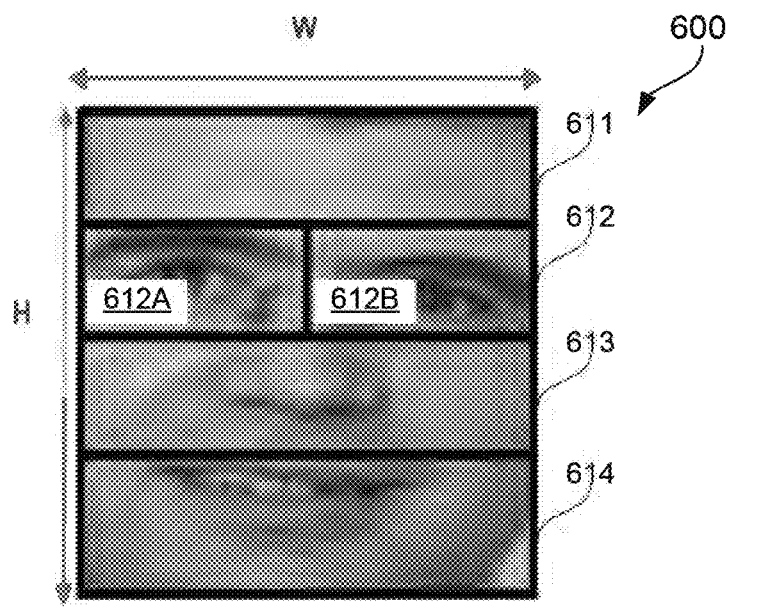
FIG. 6 shows an image of an extracted face area.
Figure 7:
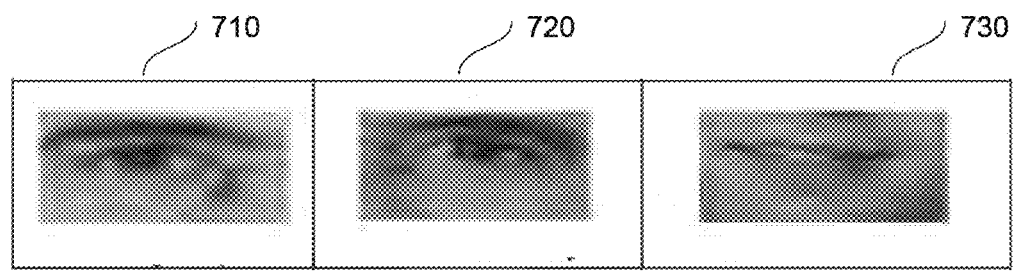
FIG. 7 shows square images of a right eye part, a left eye part, and a mouth part.

At step 1, an image 600 of an extracted face area is received as shown in FIG. 6. The image 600 can be obtained from the face selection operation. The image 600 can have a height (H) and a width (W). At step 2, the image 600 is partitioned into four portions 611-614 along the vertical direction, and each portion 611-614 has a same size and a height of H/4. At step 3, the second upper quarter 612 of the image 600 is equally divided into two areas 612A and 612B. The areas 612A and 612B each include the right eye and the left eye of the image 600, respectively. As a result of the facial part extraction process, square images of a right eye part 710, a left eye part 720, and a mouth part 730 are obtained that are shown in FIG. 7.

V. Facial Feature Extraction

V.1 Radial Curves

In one example, radial curves are employed to extract features from the facial part images 710-730 obtained from the facial part extraction operation.

Figure 8:
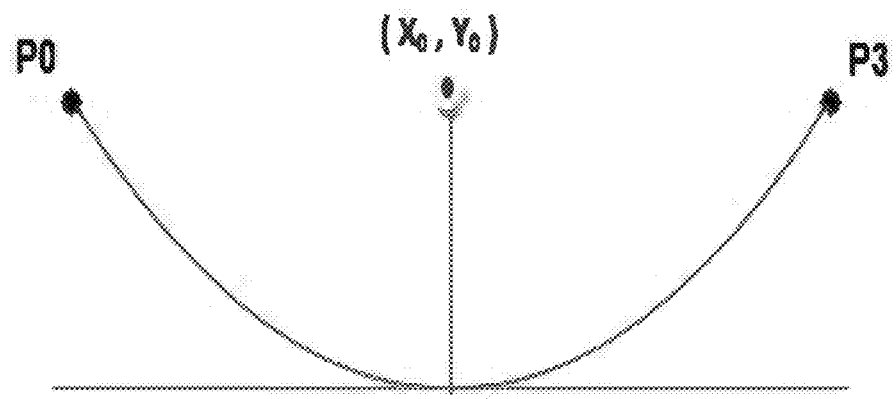
FIG. 8 shows an example radial curve.

An indexed collection is used to represent each of the extracted right eye, left eye and mouth using radial curves that are distinct as follows. The value 0 is assigned to all the pixels inside and the value 1 is assigned to all the pixels outside the eye. Using the image processing techniques, the start point (P0) and the end point (P3) of the right eye, left eye and mouth can be successfully determined using skin color and non-skin color. One radial curve of the extracted right eye, left eye or the mouth is used for feature extraction. The same procedure is applied on the extracted mouth. Then the following equation is used to deter mine the mid-point (Pi) between the P0 and P3 (see FIG. 8).

The equations of the curve parameters (f(t), g(t)) with radial point (x0, y0) and parameterized by a variable t is as follows [22]:

$$x = x_0 - \frac{g'(f'^2 + g'^2)}{f'g'' - f''g'}$$

$$y = y_0 + \frac{f'(f'^2 + g'^2)}{f'g'' - f''g'}$$

After, some mathematical calculations with respect to the parameter t, the radial catenary curve are [23]: x=t, y=cos h t, with radiant point $(x_0, y_0)$ as follows [23]: $x_r = x_0 - \cos h\, t \sin h\, t$, $y_r = y_0 + \cos h\, t$. The radial curve information using the values of the variable t is used to represent features.

Figure 9A:
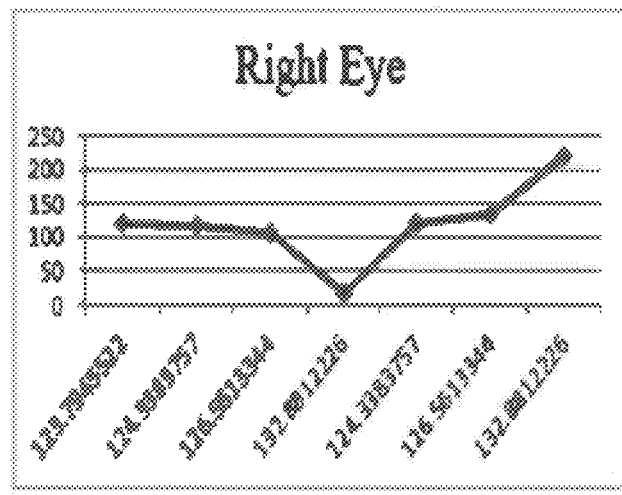
FIGS. 9A-9C show examples of obtained radial curve information based on extracted right eye, left eye and mouth according to an embodiment of the disclosure.
Figure 9B:
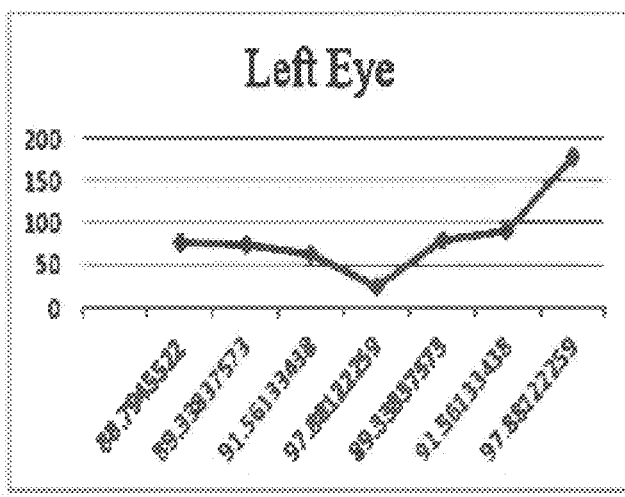
Figure 9C:
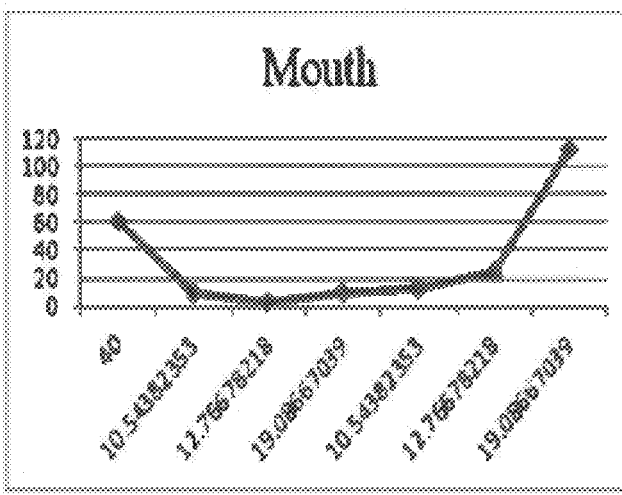

FIGS. 9A-9C show examples of the obtained radial curve information based on the extracted right eye, left eye and mouth, where the values of the variable t that are used in this work are [−5, −4, −3, −2, −1, 0, 1, 2, 3, 4, 5].

Output of the radial curve based feature extraction operation can be used as input of a neural network. As an example, a table below shows examples of input vectors. In this example, six points each with a pair of values (x, y) are obtained from one radial curve forming an input vector corresponding to a row in the table.

Features Extracted from Radial Curves Used as Input Vectors

| x1 | y1 | x2 | y2 | x3 | y3 | x4 | y4 | x5 | y5 | x6 | y6 |
|---|---|---|---|---|---|---|---|---|---|---|---|
| 48 | 71 | 80 | 68 | 112 | 67 | 145 | 68 | 80 | 81 | 112 | 80 |
| 15 | 20 | 28 | 16 | 41  | 15 | 54  | 18 | 28 | 23 | 41  | 22 |
| 20 | 47 | 29 | 42 | 38  | 41 | 47  | 45 | 29 | 50 | 38  | 50 |
| 10 | 24 | 21 | 21 | 32  | 20 | 44  | 22 | 21 | 24 | 32  | 24 |
| 2  | 8  | 20 | 7  | 38  | 5  | 56  | 5  | 20 | 15 | 38  | 14 |
| 44 | 34 | 66 | 22 | 88  | 22 | 112 | 34 | 66 | 41 | 88  | 41 |
| 41 | 34 | 64 | 26 | 87  | 25 | 111 | 31 | 64 | 33 | 87  | 32 |
| 38 | 23 | 64 | 20 | 90  | 19 | 117 | 21 | 64 | 27 | 90  | 27 |
| 15 | 7  | 24 | 3  | 33  | 3  | 44  | 6  | 24 | 10 | 33  | 10 |
| 9  | 20 | 21 | 17 | 33  | 17 | 46  | 22 | 21 | 27 | 33  | 28 |
| 6  | 27 | 29 | 23 | 52  | 23 | 75  | 27 | 29 | 35 | 52  | 35 |
| 22 | 36 | 47 | 30 | 72  | 29 | 99  | 35 | 47 | 37 | 72  | 37 |
| 26 | 42 | 52 | 36 | 78  | 36 | 104 | 41 | 52 | 47 | 78  | 45 |

V.2 Cubic Bezier Curve

In one example, cubic Bezier curves are employed to extract features from the facial part images, such as the images 710-730, obtained from the facial part extraction operation. Generally, Bezier curves are broadly used in image processing applications for different purposes such as object representation, curve fitting, interpolation and approximation. Examples of Bezier curve applications are described in the references [24, 2, 14, 20].

Multiple control points can be used to define a Bezier curve. However, more number of control points leads to higher computational complexity. To reduce computational complexity, in one example, cubic Bezier curves with four control points are used to proximate shapes of right eye, left eye and mouth in the part images. FIG. 10 shows an example of two cubic Bezier curves 1010 and 1020. Both the first and second cubic Bezier curves 1010 and 1020 initiate from point P0, and terminate at point P3. The two cubic Bezier curves 1010 and 1020 can form a shape imitating the shape of an eye or a mouth. The starting point P0 and ending point P3 can correspond to a left or right corner of an eye where the upper and lower eyelids meet. The shape of the first curve 1010 can be determined by positions of P0, P4, P5, and P3, while the shape of the second curve 1020 can be determined by positions of P0, P1, P2, and P3. As an example, an parametric equation of the second cubic Bezier curve 1020 can take the following forms, $$B(t) = (1-t)^3 P_0 + 3(1-t)^2 t P_1 + 3(1-t)t^2 P_2 + t^3 P_3,\ t \in [0,1],$$

where B(t) denotes the second cubic Bezier curve 1020, $P_0$, $P_1$, $P_2$, and $P_3$ represents the control points, and t is a parameter of the parametric equation. B(t), $P_0$, $P_1$, $P_2$, and $P_3$ are vectors representing positions of the points P0, P1, P2 and P3, respectively.

In one example, when a set of facial part images are received as input to the facial feature extraction operation, curves representing shapes of the respective right eye, left eye and mouth in the part images can be obtained, for example, by image processing techniques. Then, cubic Bezier curves can be derived to approximate the curves representing the shapes of respective facial parts. As a result, control points of respective cubic Bezier curves can be determined. As an example, FIGS. 11A-11C show three cubic Bezier curves corresponding to a set of extracted right eye, left eye and mouth.

Output of the cubic Bezier curve based feature extraction operation can be used as input of a neural network. As an example, a table below shows examples of input vectors. In this example, six points each with a pair of values (x, y) are obtained from one cubic Bezier curve forming an input vector corresponding to a row in the table.

Extracted Features of Cubic Bezier Curves Used as Input vectors

| left_eye 1_x | left_eye 1_y | left_eye 2_x | left_eye 2_y | left_eye 3_x | left_eye 3_y | left_eye 4_x | left_eye 4_y | left_eye 5_x | left_eye 5_y | left_eye 6_x | left_eye 6_y |
|---|---|---|---|---|---|---|---|---|---|---|---|
| 26 | 23 | 47 | 12 | 68 | 14 | 91 | 29 | 47 | 27 | 68 | 29 |
| 7 | 10 | 14 | 4 | 21 | 2 | 30 | 1 | 14 | 9 | 21 | 7 |
| 1 | 4 | 10 | 4 | 19 | 5 | 28 | 8 | 10 | 10 | 19 | 11 |
| 5 | 5 | 11 | 2 | 17 | 3 | 23 | 7 | 11 | 8 | 17 | 8 |
| 1 | 9 | 7 | 4 | 13 | 2 | 20 | 2 | 7 | 10 | 13 | 8 |
| 21 | 27 | 38 | 15 | 55 | 16 | 73 | 26 | 38 | 33 | 55 | 31 |
| 18 | 11 | 35 | 4 | 52 | 5 | 71 | 14 | 35 | 17 | 52 | 17 |
| 21 | 13 | 38 | 6 | 55 | 6 | 73 | 16 | 38 | 20 | 55 | 20 |
| 1 | 5 | 8 | 3 | 15 | 2 | 22 | 2 | 8 | 5 | 15 | 5 |
| 2 | 6 | 11 | 3 | 20 | 3 | 29 | 8 | 11 | 9 | 20 | 10 |
| 3 | 12 | 17 | 4 | 31 | 1 | 45 | 1 | 17 | 9 | 31 | 6 |
| 10 | 7 | 26 | 3 | 42 | 3 | 58 | 8 | 26 | 12 | 42 | 12 |
| 2 | 24 | 23 | 9 | 44 | 6 | 67 | 10 | 23 | 20 | 44 | 16 |

VI. Feedforward Artificial Neural Network

Figure 12:
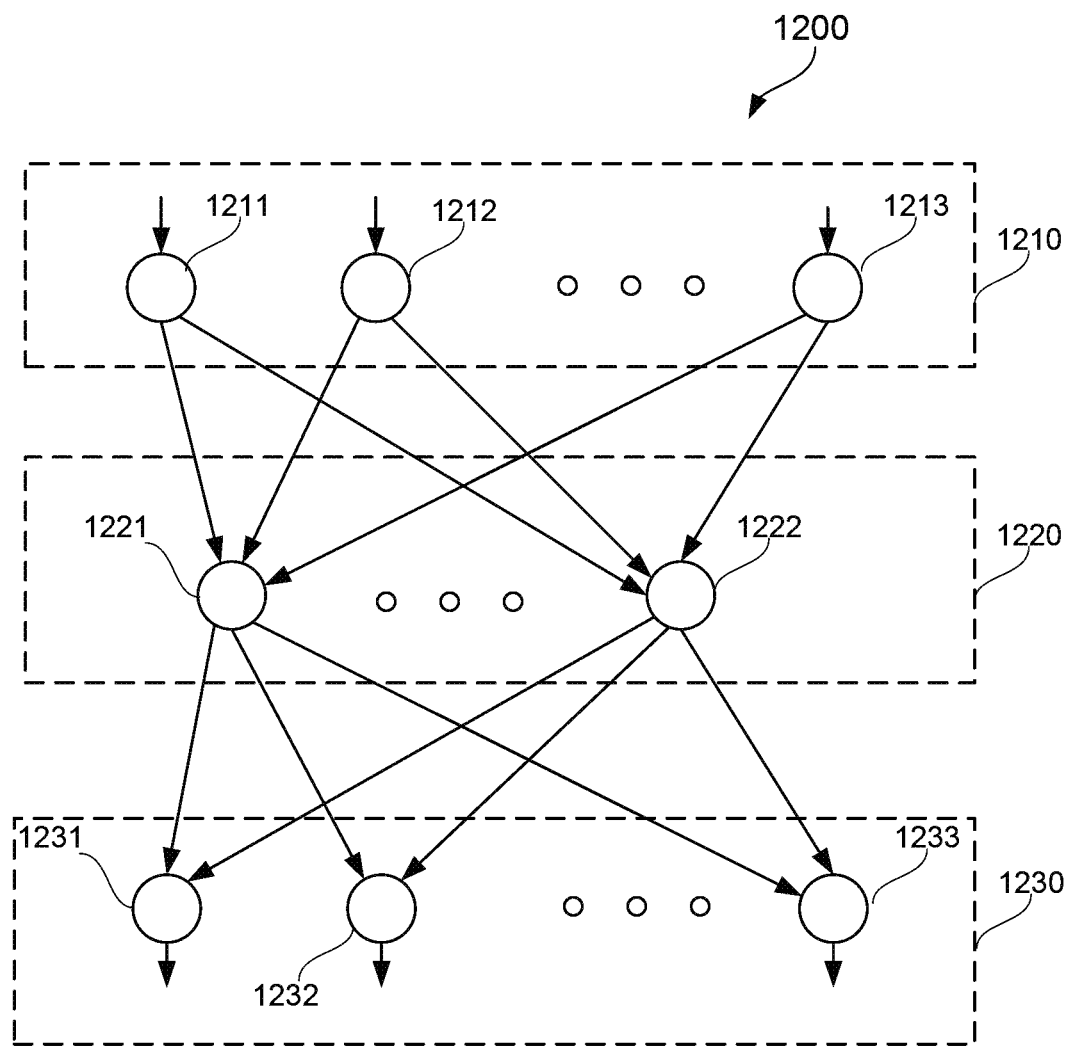
FIG. 12 shows an example feedforward artificial neural network according to an embodiment of the disclosure.

FIG. 12 shows an example feedforward artificial neural network 1200 according to an embodiment of the disclosure. The feedforward neural network (FNN) 1200 is used to perform the facial expression recognition operation at S250 in FIG. 2 example. As shown, the FNN 1200 can include an input layer 1210, a hidden layer 1220, and an output layer 1230. The input layer 1210 can include multiple input nodes 1211-1213. The hidden layer 1220 can include multiple hidden nodes 1221-1222. The output layer 1230 can include multiple output nodes 1231-1233. Each input node is connected with each hidden node, while each hidden node is connected with each output node. Each connection between the nodes can be associated with a connection weight. Each of the hidden nodes and output nodes can have an associated bias and an associated transform function.

Input information, such as extracted features corresponding to an input image, can be applied to each input node. Subsequently, each hidden node can calculate an output using the associated transform function based on the associated bias and weighted output from the input nodes that are connected to the respective hidden node. Similarly, at each output node, an output can be calculated using the associated transform function based the respective bias and weighted outputs from the hidden nodes that are connected to the respective output node. In this way, a set of outputs, forming an output vector, can be obtained when a set of inputs, an input vector formed by extracted features corresponding to an input image, is applied to the input layer 1210.

In one example, backpropagation (BP) algorithm is employed to train the FNN 1200 to optimize parameters of the FNN 1200. The parameters of the FNN 1200 can include the connection weights associated with each connection, and the bias associated with each hidden node or output node. The connection weights between the input layer and the hidden layer can form a first weight vector W1, while the connection weights between the hidden layer and the output layer can form a second weight vector W2. Similarly, biases of the hidden nodes and the output nodes can form a first and second bias vectors, B1 and B2, respectively.

In one example of the BP training process, an initial set of the parameters of the FNN 1200 can be randomly determined in a predefined range. Then, a plurality of training cycles can be performed to update the parameters. In each cycle, extracted features corresponding to an input image is utilized to train the FNN 1200. Specifically, an input vector is applied to the input node 1211-1213 of the FNN 1200. Information is propagated forward through the FNN 1200, layer by layer, until it reaches the output layer 1230. An output vector can thus be obtained. The output vector can then be compared to a desired output vector. The desired out vector correctly indicates an emotion category corresponding to the input image, while the output vector obtained above may not correctly indicate the emotion category due to the current set of the parameters.

An error value can be calculated for each of the output node 1231-1233 based on a loss function. The error values are then propagated backwards, starting from the output layer 1230, until each node has an associated error value which roughly represents its contribution to the original output vector. The error values can be used to calculate a gradient of the loss function with respect to the respective connection weights at each hidden node or output node in the network. Thereafter, the gradient can be used to update the connection weights to minimize the loss function.

One drawback of a BP algorithm is that performance of the BP algorithm depends on initial network parameters determined at the beginning of a training process and tend to become trapped in local optimum. In order to avoid this problem, in one example, a genetic algorithm (GA) process is first performed to search for a set of optimized network parameters. The set of optimized network parameters are then used as the initial network parameters for the BP training process. The GA can avoid local optimum by searching in several regions simultaneously (working on a population of candidate solutions). Accordingly, a global optimum can be obtained. In one example, the GA includes an iterated local search (ILS) algorithm to further improve the searching performance. Accordingly, a hybrid algorithm for training the FNN 1200 is formed by combine the ILS, GA and BP algorithms in one example, which is referred to as an ILSGA-BP algorithm.

VII. ILSGA-BP Algorithm

Figure 13:
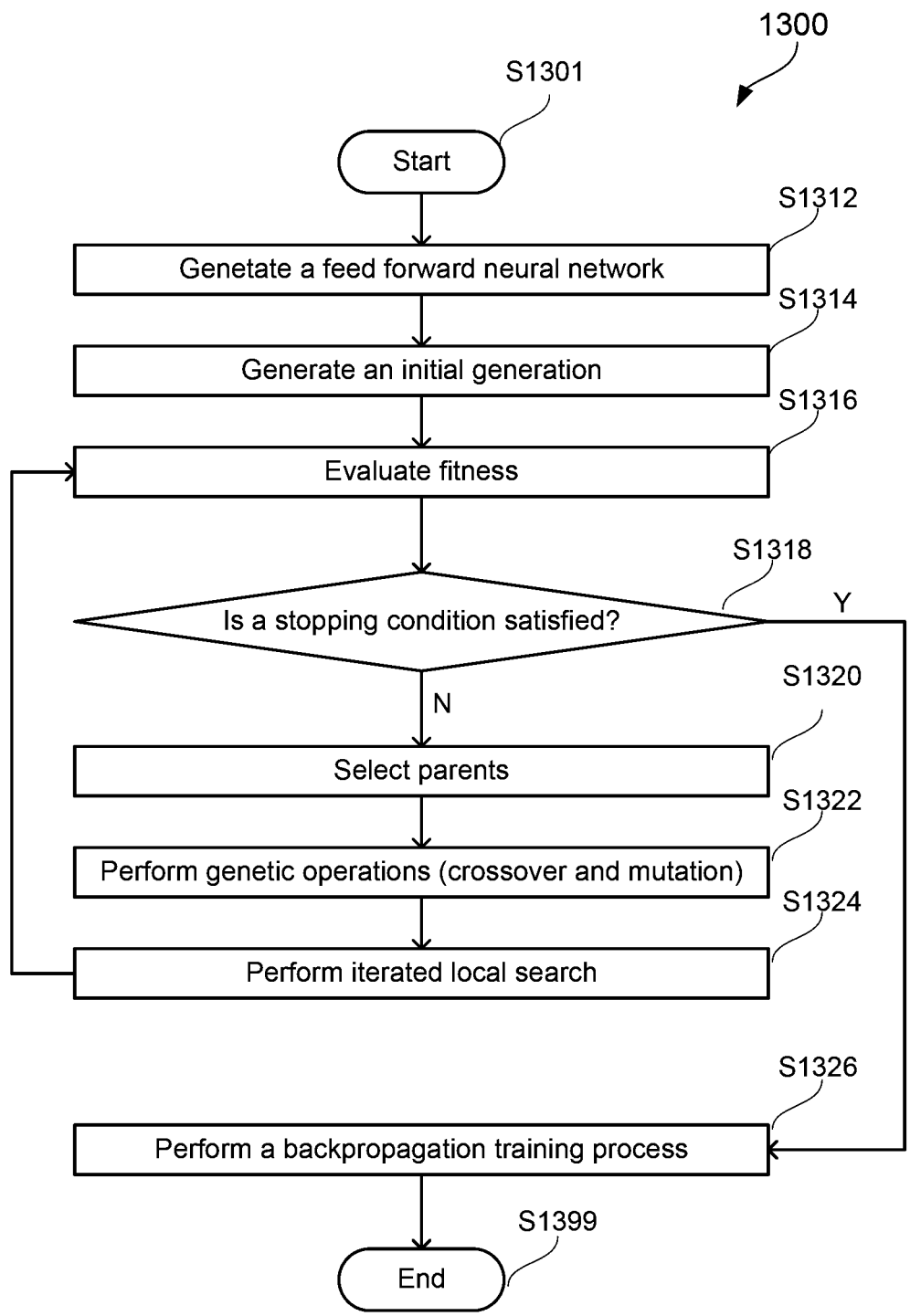
FIG. 13 shows an example process for training an artificial neural network according to an embodiment of the disclosure.

FIG. 13 shows an example process 1300 for training an artificial neural network according to an embodiment of the disclosure. The ILSGA-BP algorithm is implemented in the process 1300. The process starts from S1301 and proceeds to S1312.

At S1312, a FNN for facial expression recognition can be generated. For example, a structure of the FNN can be determined. The structure can define how many layers are included in the FNN, how many nodes are included in each layer, ranges of network weights and biases, a transform function associated with hidden nodes or output nodes, and the like. The FNN 1200 is used as an example below for explanation of the process 1300.

At 1314, an initial generation of solutions is generated. Each solution corresponds to a set of network parameters of the FNN 1200, and is referred to as a chromosome. Each set of network parameters can include a set of connection weights and the biases that can be determined randomly within predefined ranges. Accordingly, in one example, each chromosome can be formed by concatenating four vectors W1, W2, B1, and B2. Each of the four vectors W1, W2, B1, and B2 contains the randomly determined connection weights or biases. Each such a weight or bias is referred to as gene of the respective chromosome. In one example, values of genes are defined within a range of from −1 to 1, and each gene is encoded as a binary string. Accordingly, the initial population includes a plurality of chromosomes, each chromosome includes a sequence of binary strings, and each binary string corresponds to a network weight or bias. The number of chromosomes in each generation of population is referred to as the size of the population.

At S1314, fitness of chromosomes of a generation is evaluated based on a fitness function and a fitness value is given to each chromosome according to the fitness of the each chromosome. The fitness value indicates how good a set of network parameters is in terms of enhancing the performance of the FNN 1200. In one example, a variance accounted for (VAF) function is used as the fitness function to evaluate a chromosome. The VAF function can take the following farm, $$V = 1 - \frac{\text{variance } (y - y\_est)}{\text{variance } (y)},$$

where V represents a fitness value of the chromosome under evaluation, y represents an output vector corresponding to an input vector to the FNN 1200 configured with a set of network parameters represented by the chromosome under evaluation, and y_est represents a desired output vector corresponding to the input vector. The more the output vector y is similar to the desired output vector y_est, the higher the fitness value V. In one example, multiple sets of input vectors are used to evaluate the fitness of a chromosome. Accordingly, a final fitness value can be obtained by averaging the fitness values corresponding to each input vector.

At S1318, whether a stopping condition is satisfied is determined. For example, the stopping condition can include a maximum number of generations has been reached, or/and a chromosome having a fitness value larger than a fitness value threshold has been found. When the stopping condition is satisfied, the process 1300 proceeds to S1326. Otherwise, the process proceeds to S1320.

At S1320, parents are selected for reproduction. For example, chromosomes with higher fitness values have a higher probability to be selected to be the parents for reproduction of new population. In one example, the roulette wheel selection method is employed to select the parents for reproduction.

At S1322, genetic operations are performed to generate a next generation of chromosomes. In one example, the genetic operations include crossover operation and mutation operation. In one example, single point crossover is selected for the crossover operation. Specifically, during the single point crossover operation, a point in each of a pair of parent binary strings can be randomly selected, and the parent binary strings can be divided at the point resulting in two segments in each of the parent binary strings. Thereafter, corresponding segments after the point in two parent strings can be exchanged. As a result, two child chromosomes can be obtained. In one example of the mutation operation, a mutation rate is preconfigured that defines a probability for modifying each bit in a chromosome binary string. For example, the mutation rate is configured to be 2%. Accordingly, each bit in a chromosome generated from the crossover operations can have a probability of 2% to be modified.

At S1324, an ILS is performed. The basic idea of ILS is to improve the procedure of local search through affording a new solution to start with. These solutions are obtained from perturbed existing solutions until reaching a local optimal solution. The generated solutions have better-quality than the solutions from repetitive local search trials. If the acceptance criterion is passed, it is considered as a new solution. If not, the previous solution is returned. The perturbations should be robust enough to allow exploring new solutions, and, on the other hand, sufficiently weak to keep good information added in the previous search. An example of the ILS represented with pseudo code is shown below.

| ILS Procedure |
|---|
| begin<br>  $s_0$ = Generate initial solution<br>  Employ a local search procedure to $s_0$ and get s<br>  Repeat<br>    Employ perturbation to s and get s'<br>    Employ local search procedure to s' and get s''<br>    If f(s'')> f(s);<br>    s← s''<br>  until Termination Criterion is met<br>  return s;<br>end |

At S1326, a BP training process is performed to train the FNN 1200. For example, a chromosome having a fitness value above the fitness value threshold may be obtained from the iteration of the steps S1316-S1324. Alternatively, when the iteration reaches the number of generations defined in the stopping condition, a chromosome having the highest fitness value can be selected from the last generation. Accordingly, network parameters represented by the above obtained or selected chromosome can be used as initial network parameters for the BP training process. As described above, a plurality of input images can be employed to train the FNN 1200 to further optimize the network parameters of the FNN 1200. As a result, a set of optimized network parameters can be finally obtained. With the set of optimized network parameters, the FNN 1200 can be ready to perform tasks of facial expression recognition. The process 1300 proceeds to S1399 and terminates at S1399.

VIII. Experimental Results

Various experiments are performed to validate facial expression techniques described in this disclosure. In each experiment, a FNN similar to the FNN 1200 is first trained by performing the process 1300, and subsequently used to carry out a facial expression recognition test. Facial expression features for training or testing are obtained from input images by perfolining the steps of S210-S240 in the process 200.

Figure 14:
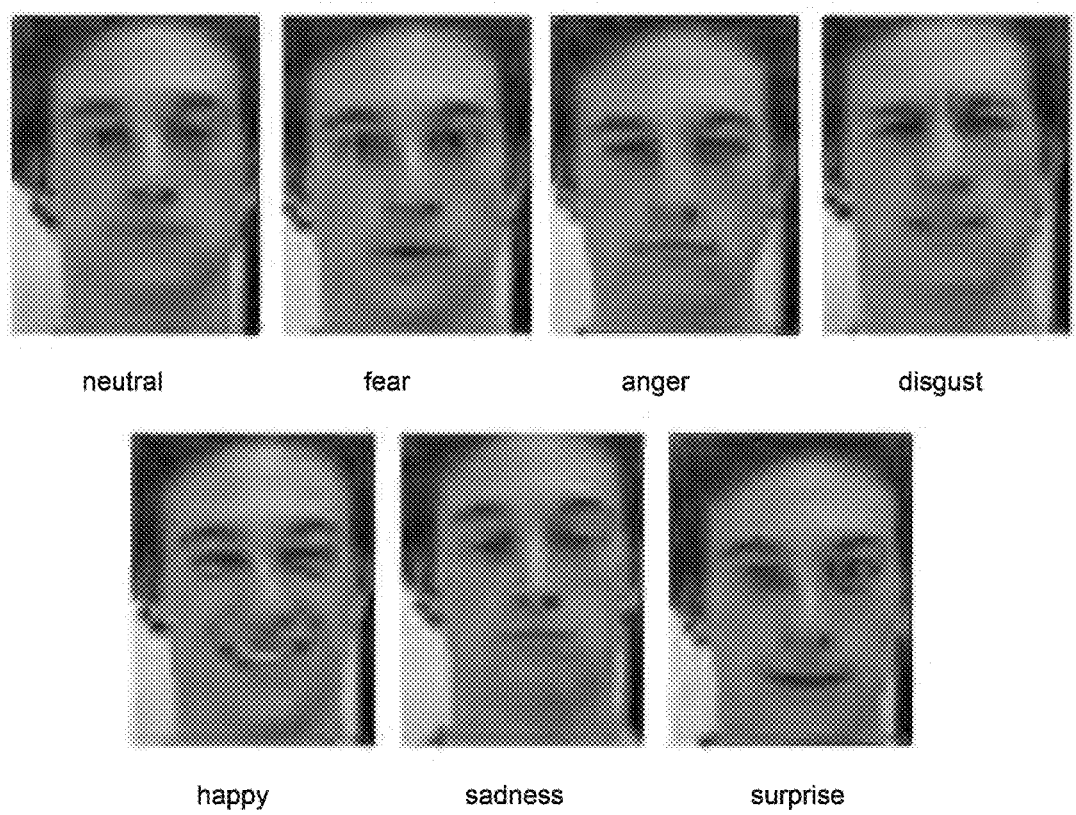
FIG. 14 shows an example of seven types of facial expressions.

The FEEDTUM database is used for the experiments. The database contains images of 9 female and 10 male European people in the age between 20 and 35 years old. The database includes 5700 images of the 19 people. The images each have a size of 320×240 pixels. Each of the 19 individuals exhibits seven types of facial expressions that can be classified into seven emotion categories, namely, surprise, happiness, disgust, neutral, fear, sadness and anger. For each type of facial expression, a sequence of three images showing three stages of development of an expression is obtained. FIG. 14 shows an example of seven types of facial expressions. In the experiments, 700 images from the FEEDTUM database have been used, and 100 images are selected for each type of facial expressions. In addition, the 100 selected images of each type of facial expression are divided as the following: 30 images for the testing and 70 images for the training process in each experiment.

The following four experiments are conducted: (1) a first experiment with the ILSGA-BP algorithm based on facial expression features extracted using radial curves; (2) a second experiment with the ILSGA-BP algorithm based on facial expression features extracted using Cubic Bezier curves; (3) a third experiment with the ILSGA-BP algorithm based on a combination of features extracted using radial curves and Cubic Bezier curves; (4) a fourth experiment where the ILSGA-BP algorithm and traditional BP algorithm compared. Specifically, during the fourth experiment, experiments similar to the experiments (1)-(3) are performed; however, the FNNs are trained with a traditional BP algorithm instead of the ILSGA-BP algorithm.

FIG. 15 show numbers of extracted features used in different experiments. As shown, for experiments with features extracted using radial curves or cubic Bezier curves, 23 extracted features are employed. Accordingly, respective FNNs have an input layer including 23 input nodes. For experiments with a combination of features extracted using radial curves and cubic Bezier curves, 46 extracted features are employed. Accordingly, respective FNNs have an input layer including 46 input nodes.

FIG. 16 shows numbers of hidden nodes or output nodes in FNNs for experiments based on the traditional BP algorithm or the ILSGA-BP algorithm. As shown, For all experiments, 45 hidden nodes and 7 output nodes are employed. FIG. 17 shows a set of parameters used by the training process 1300 during the experiments. As shown, a population size for the process 1300 is defined to be 1100. A cross over ratio is defined to be 0.8. A crossover type is defined to be the single point crossover operation. A mutation rate is defined to be 0.02. A fitness value threshold is defined to be 0.8.

FIG. 18 shows a table 1800 including results of the first experiment where the radial curves are used to extract and represent facial expression features. Each of the rows 1811-1817 shows experimental results of one facial expression. For example, for row 1811, 30 input images having a "disgust" expression are employed for the testing. Among the 30 testing results, 24 input images are recognized as the "disgust" expression, one input image is recognized as "Neural", two input images are recognized as "anger", while three input images are recognized as "fear". Similarly, testing results corresponding to other types of facial expressions are presented in other rows 1812-1817. The last column 1820 shows facial expression recognition accuracies corresponding to different types of expressions. Specifically, the accuracies for different types of expressions are: disgust, 80%, neutral, 83%, anger, 83%, sadness, 90%, happiness, 97%, fear, 87%, surprise, 97%.

Similarly, FIG. 19 shows a table 1900 including results of the second experiment where the cubic Bezier curves are used to extract and represent facial expression features. The obtained facial expression recognition accuracies are: disgust, 83%, neutral, 83%, anger, 87%, sadness, 90%, happiness 93%, fear, 90%, surprise, 97%%. Also similarly, FIG. 20 shows a table 2000 including results of the third experiment where the radial curves as well as the cubic Bezier curves are used to extract and represent facial expression features. The obtained facial expression recognition accuracies are: disgust, 93%, neutral, 87%, anger, 90%, sadness, 93%, happiness, 97%, fear, 97%, surprise, 97%.

FIG. 21 shows a table 2100 including results of the fourth experiments. As shown, based on the extracted features using the radial curves, Cubic Bezier curves and the combination of them, the experimental results show that the ILSGA-BP algorithm outperfo, wed the BP algorithm with overall accuracy 88%, 89% and 93.4%, respectively, compared to 83%, 82% and 85%, respectively, using the BP algorithm.

According to the disclosure, the processes implementing the ILSGA-BP algorithm outperfoi III a method described in the reference [2]. The method described in the reference [2] uses the same facial expressions database FEEDTUM as well as the same number of input images for each facial expression for testing processes. The method in the reference [2] obtains a percentage of 78.2% accuracy average compared with the accuracy average of 93.4% obtained by the processes in this disclosure. In addition, it is obvious that portions of sadness, fear, and anger expressions are misclassified in to happiness, surprise, fear, anger, sadness, disgust, respectively, with the method in the reference [2], however, the ILSGA-BP algorithm classifies sadness, fear, and anger expressions with higher accuracies.

The reason for the misclassification in the disclosure and the reference [2]can be that images in the FEEDTUM database contain intra-class confusions (between fear, anger, sadness and disgust on one side and happiness and surprise on the other side), which makes it difficult to recognize facial expressions correctly. In addition, the ILSGA-BP algorithm classifies the disgust expression with the lowest accuracy and surprise expression with the highest accuracy. The low recognition of the disgust expression can be attributed to the fact that people express disgust feelings in different ways. Further, in the experiment based on the extracted features using the combination of the radial curves and the Cubic Bezier curves, out of 30 input facial images with neutral expressions, 26 are recognized successfully and the remaining are recognized as anger, happiness, fear and surprise. This may be attributed to variety of the reaction intensities.

IX. Apparatus for Implementing the Processes Described Herein

Figure 22:
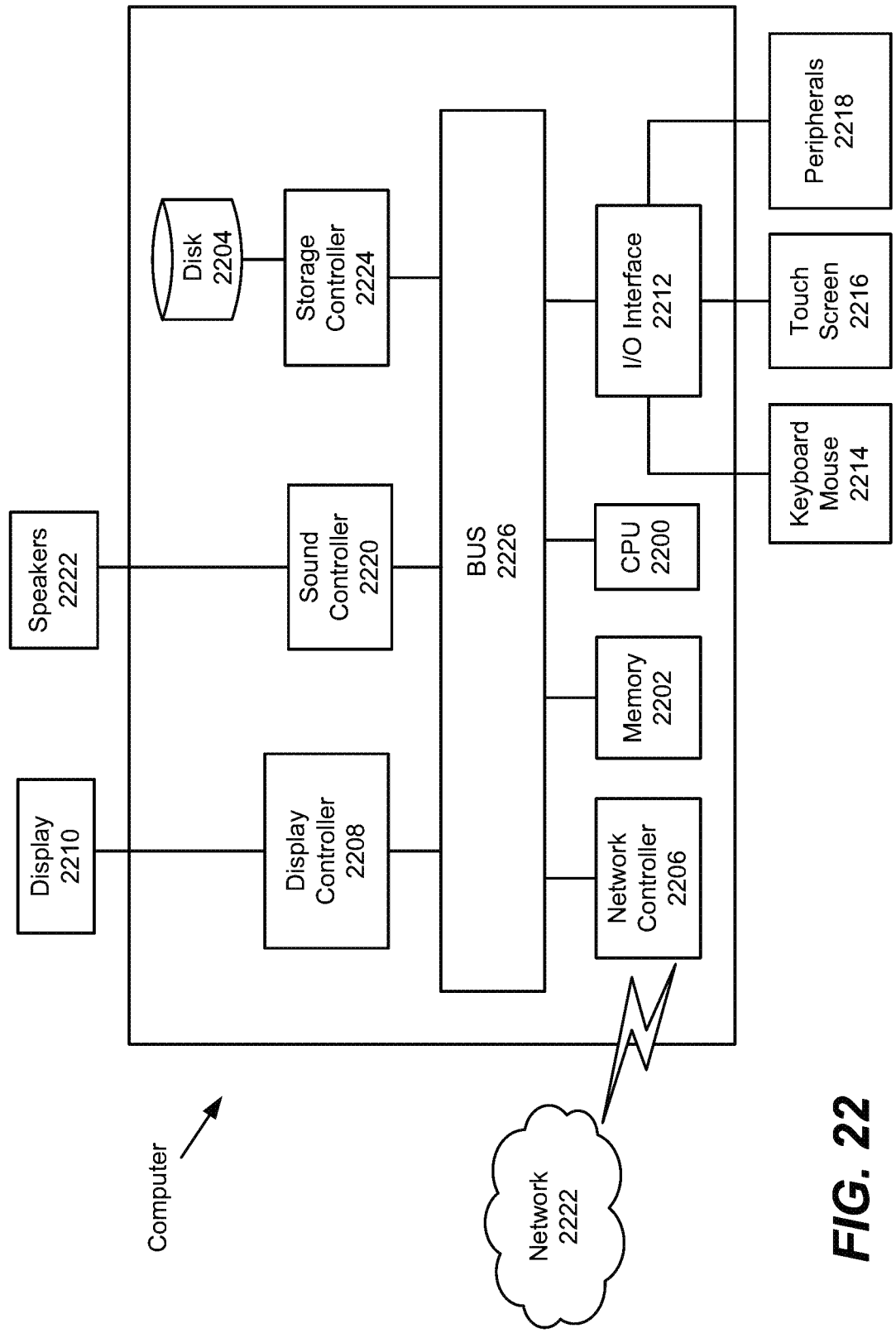
FIG. 22 show an example computer for implementing processes and functionality described herein.

An example computer for implementing the processes and functionality described herein is described with reference to FIG. 22 according to exemplary embodiments. In FIG. 22, the computer includes a CPU 2200 which performs processes, such as the processes 200, 1300, and the FNN 1200, described above. The process data and instructions may be stored in memory 2202. These processes and instructions may also be stored on a storage medium disk 2204 such as a hard drive (HDD) or portable storage medium or may be stored remotely. Further, the process data and instructions are not limited by the form of the computer-readable media on which the instructions of the inventive process are stored. For example, the instructions may be stored on CDs, DVDs, in FLASH memory, RAM, ROM, PROM, EPROM, EEPROM, hard disk or any other information processing device with which the computer communicates, such as a server or computer.

Further, the processes may be provided as a utility application, background daemon, or component of an operating system, or combination thereof, executing in conjunction with CPU 2200 and an operating system such as Microsoft Windows 7, UNIX, Solaris, LINUX, Apple MAC-OS and other systems known to those skilled in the art.

The hardware elements may be realized by various circuitry elements, known to those skilled in the art. For example, CPU 2200 may be a Xenon or Core processor from Intel of America or an Opteron processor from AMD of America, or may be other processor types that would be recognized by one of ordinary skill in the art. Alternatively, the CPU 2200 may be implemented on an FPGA, ASIC, PLD or using discrete logic circuits, as one of ordinary skill in the art would recognize Further, CPU 2200 may be implemented as multiple processors cooperatively working in parallel to perform the instructions of the inventive processes described above.

The computer in FIG. 22 also includes a network controller 2206, such as an Intel Ethernet PRO network interface card from Intel Corporation of America, for interfacing with network 2222. As can be appreciated, the network 2222 can be a public network, such as the Internet, or a private network such as an LAN or WAN network, or any combination thereof and can also include PSTN or ISDN sub-networks. The network 2222 can also be wired, such as an Ethernet network, or can be wireless such as a cellular network including EDGE, 3G and 4G wireless cellular systems. The wireless network can also be WiFi, Bluetooth, or any other wireless form of communication that is known.

The computer further includes a display controller 2208, such as a NVIDIA GeForce GTX or Quadro graphics adaptor from NVIDIA Corporation of America for interfacing with display 2210, such as a Hewlett Packard HPL2445w LCD monitor. A general purpose I/O interface 2212 interfaces with a keyboard and/or mouse 2214 as well as a touch screen panel 2216 on or separate from display 2210. General purpose I/O interface also connects to a variety of peripherals 2218 including printers and scanners, such as an OfficeJet or DeskJet from Hewlett Packard.

A sound controller 2220 is also provided in the computer, such as Sound Blaster X-Fi Titanium from Creative, to interface with speakers/microphone 2222 thereby providing sounds and/or music.

The general purpose storage controller 2224 connects the storage medium disk 2204 with communication bus 2226, which may be an ISA, EISA, VESA, PCI, or similar, for interconnecting all of the components of the computer. A description of the general features and functionality of the display 2210, keyboard and/or mouse 2214, as well as the display controller 2208, storage controller 2224, network controller 2206, sound controller 2220, and general purpose I/O interface 2212 is omitted herein for brevity as these features are known.

The present disclosure is not limited to the specific circuit elements described herein, nor is the present disclosure limited to the specific sizing and classification of these elements.

The functions and features described herein may also be executed by various distributed components of a system. For example, one or more processors may execute these system functions, wherein the processors are distributed across multiple components communicating in a network. The distributed components may include one or more client and server machines, which may share processing resources in addition to various human interface and communication devices (e.g., display monitors, smart phones, tablets, personal digital assistants (PDAs)). The network may be a private network, such as a LAN or WAN, or may be a public network, such as the Internet. Input to the system may be received via direct user input and received remotely either in real-time or as a batch process. Additionally, some implementations may be performed on modules or hardware not identical to those described. Accordingly, other implementations are within the scope that may be claimed.

The above-described hardware description is a non-limiting example of corresponding structure for performing the functionality described herein.

While aspects of the present disclosure have been described in conjunction with the specific embodiments thereof that are proposed as examples, alternatives, modifications, and variations to the examples may be made. Accordingly, embodiments as set forth herein are intended to be illustrative and not limiting. There are changes that may be made without departing from the scope of the claims set forth below.

What is claimed is:

1. A method for facial expression recognition, comprising:
   generating a feedforward neural network (FNN) for facial expression recognition;
   performing a genetic algorithm (GA) process for optimizing network parameters of the FNN to obtain a first set of network parameters of the FNN;
   performing, using processing circuitry, a backpropagation (BP) training process of the FNN with the first set of network parameters as initial network parameters to obtain a second set of network parameters of the FNN; and
   performing facial expression recognition using the trained FNN configured with the second set of network parameters.

2. The method of claim 1, wherein performing the GA process includes:
   generating an initial generation of chromosomes each representing a set of network parameters of the FNN;
   evaluating fitness of chromosomes in a current generation, wherein a fitness value of a chromosome is calculated based on a variance-accounted-for (V AF) function; and
   performing an iterated local search (ILS) based on reproduced child chromosomes to obtain optimized child chromosomes.

3. The method of claim 2, wherein performing the GA process further includes:
   repeating selecting of parent chromosomes, performing genetic operations, perfoiming the ILS, and evaluating the fitness of chromosomes until a stopping condition is satisfied, wherein the stopping condition is a function of finding a chromosome having a fitness value above a fitness value threshold.

4. The method of claim 2, wherein the FNN includes an input layer including input nodes, and an output layer including output layer,
   wherein extracted features of a facial expression fo, m an input vector that is applied to the input layer, and an output vector corresponding to the facial expression is generated at the output layer indicating an emotion category in which the facial expression is classified.

5. The method of claim 4, wherein
   each chromosome includes a sequence of binary strings, each binary string corresponding to a connection weight or a bias of the FNN.

6. The method of claim 4, wherein the extracted features are extracted using one of radial curves, or cubic Bezier curves.

7. The method of claim 1, wherein performing facial expression recognition using the trained FNN includes:

receiving an input image of a facial expression corresponding to an emotion category;

determining a skin area by classifying pixels in the input image into skin pixels and. non-skin pixels based on values of color components of the respective pixels in the input image;

extracting a face area from the input image based on the skin area;

extracting images of facial parts from the extracted face area, the facial parts including a left eye, a right eye, and a mouth included in the input image;

extracting facial expression features from the facial part images using radial curves, andlor cubic Bezier curves; and applying the extracted features to the trained FNN to determine an emotion category of the input facial expression.

8. An apparatus for facial expression recognition, comprising:

processing circuitry configured to:

generate a feedforward neural network (FNN) for facial expression recognition, perform a genetic algorithm (GA) process for optimizing network parameters of the FNN to obtain a first set of network parameters of the FNN, perform a backpropagation (BP) training process of the FNN with the first set of network parameters as initial network parameters to obtain a second set of network parameters of the FNN, and perform facial expression recognition using the trained FNN configured with the second set of network parameters.

9. The apparatus of claim 8, wherein the processing circuitry is further configured to:

generate an initial generation of chromosomes each representing a set of network parameters of the FNN, evaluate fitness of chromosomes in a current generation, wherein a fitness value of a chromosome is calculated based on a variance-accounted-for (VAF) function, and perform an iterated local search (ILS) based on reproduced child chromosomes to obtain optimized child chromosomes.

10. The apparatus of claim 9, wherein the processing circuitry is further configured to:

repeat selecting of parent chromosomes, performing genetic operations, perfouning the ILS, and evaluating the fitness of chromosomes until a stopping condition is satisfied wherein the stopping condition is a function of finding a chromosome having a fitness value above a fitness value.

11. The apparatus of claim 9, wherein the FNN includes an input layer including input nodes, and an output layer including output layer, wherein extracted features of a facial expression form an input vector that is applied to the input layer, and an output vector corresponding to the facial expression is generated at the output layer indicating an emotion category in which the facial expression is classified.

12. The apparatus of claim 11, wherein each chromosome includes a sequence of binary strings, each binary string corresponding to a connection weight or a bias of the FNN.

13. The apparatus of claim 11, wherein the extracted features are extracted using one of radial curves, or cubic Bezier curves.

14. The apparatus of claim 8, wherein the processing circuitry is further configured to:

receive an input image of a facial expression corresponding to an emotion category;

determine a skin area by classifying pixels in the input image into skin pixels and non-skin pixels based on values of color components of the respective pixels in the input image;

extract a face area from the input image based on the skin area;

extract images of facial parts from the extracted face area, the facial parts including a left eye, a right eye, and a mouth included in the input image;

extract facial expression features from the facial part images using radial curves, and/or cubic Bezier curves; and apply the extracted features to the trained FNN to determine an emotion category of the input facial expression.

15. A non-transitory computer-readable medium having stored thereon computer readable instructions which when executed by a computer cause the computer to perform a method for facial expression recognition, the method comprising:

generating a feedforward neural network (FNN) for facial expression recognition;

performing a genetic algorithm (GA) process for optimizing network parameters of the FNN to obtain a first set of network parameters of the FNN;

performing a backpropagation (BP) training process of the FNN with the first set of network parameters as initial network parameters to obtain a second set of network parameters of the FNN; and performing facial expression recognition using the trained FNN configured with the second set of network parameters.

16. The non-transitory computer-readable medium of claim 15, wherein performing the GA process includes:

generating an initial generation of chromosomes each representing a set of network parameters of the FNN;

evaluating fitness of chromosomes in a current generation, wherein a fitness value of a chromosome is calculated based on a variance-accounted-for (VAF) function; and performing an iterated local search (ILS) based on reproduced child chromosomes to obtain optimized child chromosomes.

17. The non-transitory computer-readable medium of claim 16, wherein the FNN includes an input layer including input nodes, and an output layer including output layer, wherein extracted features of a facial expression form an input vector that is applied to the input layer, and an output vector corresponding to the facial expression is generated at the output layer indicating an emotion category the facial expression is classified into.

18. The non-transitory computer-readable medium of claim 17, wherein each chromosome includes a sequence of binary strings, each binary string corresponding to a connection weight or a bias of the FNN.

19. The non-transitory computer-readable medium of claim 17, wherein the extracted features are extracted using one of radial curves, or cubic Bezier curves.

20. The non-transitory computer-readable medium of claim 15, wherein performing facial expression recognition using the trained FNN includes:

receiving an input image of a facial expression corresponding to an emotion category;

determining a skin area by classifying pixels in the input image into skin pixels and non-skin pixels based on values of color components of the respective pixels in the input image;

extracting a face area from the input image based on the skin area;

extracting images of facial parts from the extracted face area, the facial parts including a left eye, a right eye, and a mouth included in the input image;

extracting facial expression features from the facial part images using radial curves, and/or cubic Bezier curves; and applying the extracted features to the trained FNN to determine an emotion category of the input facial expression.

* * * * *